Feb. 24, 1959  A. H. GOREY  2,874,623
MESSAGE REGISTERING CAMERA
Filed Aug. 27, 1952  6 Sheets-Sheet 1

INVENTOR.
ARCHIE H. GOREY
BY
ATTORNEY

INVENTOR.
ARCHIE H. GOREY
BY
ATTORNEY

Feb. 24, 1959  A. H. GOREY  2,874,623
MESSAGE REGISTERING CAMERA
Filed Aug. 27, 1952  6 Sheets-Sheet 3

INVENTOR.
ARCHIE H. GOREY
BY
ATTORNEY

Feb. 24, 1959    A. H. GOREY    2,874,623
MESSAGE REGISTERING CAMERA
Filed Aug. 27, 1952    6 Sheets-Sheet 4

INVENTOR.
ARCHIE H. GOREY
BY
ATTORNEY

Feb. 24, 1959

A. H. GOREY 2,874,623

MESSAGE REGISTERING CAMERA

Filed Aug. 27, 1952

INVENTOR
ARCHIE H. GOREY

BY

ATTORNEY

United States Patent Office

2,874,623
Patented Feb. 24, 1959

2,874,623

MESSAGE REGISTERING CAMERA

Archie H. Gorey, Irondequoit, N. Y., assignor to Graflex, Inc., Rochester, N. Y., a corporation of Delaware Application August 27, 1952, Serial No. 306,571

7 Claims. (Cl. 95—11.5)

The present invention relates to photographic cameras, and more particularly to cameras for making photographic records of meter and like readings.

Telephone companies are accustomed to meter the number of calls made by customers, particularly commercial telephone users, and to bill those customers periodically from the meter readings. It has been found that errors occur when written records are made of meter readings. Errors may be made in reading the meters, in recording the readings on a report sheet, and in transcribing the readings of the report sheet to the monthly bill. Moreover, if an error is made in recording the reading, there is no method of checking this error, because after the recording the meter is either reset, or will have recorded additional calls. For these reasons special cameras have been developed to photograph meter readings. The photographs avoid any possibility of error in recording the readings. They provide, moreover, a permanent record of the readings for as long a period as desired, so that should an error be made in transcribing the record to a bill, the actual reading can quickly be checked from the photograph.

The primary purpose of the present invention is to provide a camera for recording meter readings which is simpler and more compact in construction, lighter, and easier to handle than conventional types of such cameras.

Another object of the invention is to provide a camera of the type described in which the operation of the shutter will be properly and definitely synchronized with the winding or feeding of the film and in which successive exposures may be made with great rapidity one after another.

Another object of the invention is to provide a camera of the character described in which a flash lamp may be employed and in which the operation of the shutter is synchronized with the operation of the flash lamp.

Another object of the invention is to provide a simple and efficient shutter mechanism for a camera of the class described that will be positive in its operation and will stand hard usage.

A further object of the invention is to provide a camera of the type described equipped for electrical operation in such a manner as to be more efficient.

Other objects of the invention are to provide a camera in which the manual effort required in operation is reduced to a minimum, to provide a camera in which loading and unloading of the film is simplified, and to provide a camera in which the advance of the film from one exposure area to another is precisely metered to avoid waste of film.

Still other objects of the invention will be apparent hereinafter from the specification when read in the light of the accompanying drawings, and from the recital of the appended claims.

The camera illustrated has a film-winding mechanism that is electrically operated. It carries its own illumination so as to properly illuminate the meter dials. It may be connected to a portable power pack which, in turn, may be connected by a flexible cord with any convenient electrical circuit to enable the operator of the camera to move the same from one group of meters to another group throughout an entire telephone exchange. In using the camera the operator simply holds the camera to a group of meters and presses a trigger. This actuates a member which operates first to open the camera shutter and to actuate the camera's flashlamps in proper synchronism with the opening of the shutter and which then permits the shutter to close, so that a proper exposure is made on one picture area of the camera film. Then this member actuates a motor to cause the film to be automatically wound to the extent of one exposure area, whereby the picture previously taken is wound up on the take-up roll and a new picture area is presented in the field of exposure. The winding of the film occurs very rapidly and is ordinarily accomplished while the camera is being moved from one group of meters to another.

Figure 5:
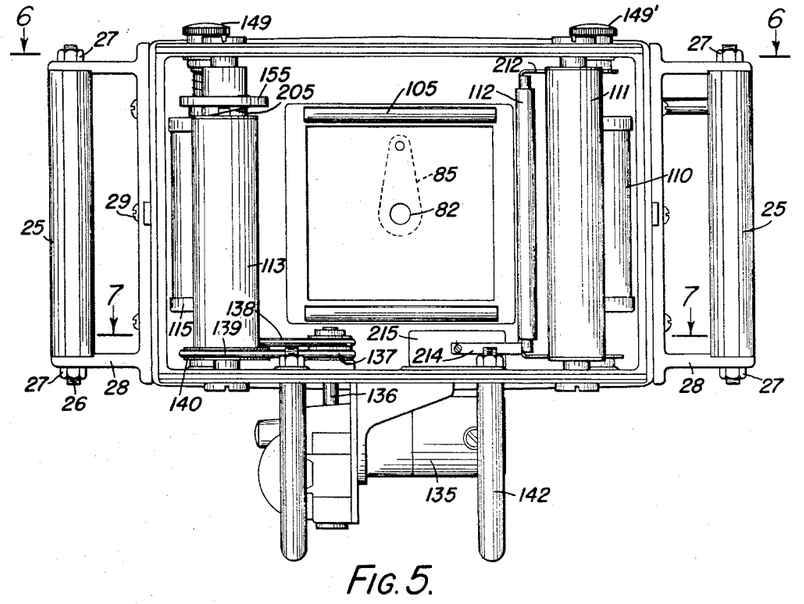
Fig. 5 is a rear view of the camera with the covering hood removed.

The camera comprises three principal sections disposed one behind the other, namely, a hood 20, a center section 21 (Figs. 1 and 2) which houses the flash lamps, and a rear section 22 which supports the operating mechanism of the camera. The camera is adapted to be supported for use by a pair of handles 25 (Figs. 1, 2 and 5) disposed at opposite sides of the operating portion 22 of the camera and adapted to be grasped by the operator so as to hold the camera properly in position over the dials of the meters whose picture is to be taken. Each handle 25 is secured by a shaft 26 and nuts 27 to brackets 28 that are fastened by screws 29 to the housing 30 (Fig. 6) that carries the operating mechanism.

The hood 20 is rectangular in cross-section. It is adapted to be set close against and surround a group of meter dials or registers or other objects to be photographed. To improve the picture, four reflector plates are riveted along the four sides of the hood 20 at the mouth of the same. The two reflector plates 35 and 36 (Figs. 1, 2 and 3) at opposite vertical sides of the hood are riveted flat against those sides by rivets 39 and 39', respectively. The two reflector plates 37 and 38 at the top and bottom, respectively, of the hood are adjustable so that their inclination to a horiozntal plane can be adjusted. The lower plate 38 is riveted along its front edge by rivets 40 to the hood so that its front edge is flush with the front lower edge of the hood. It has adjusting jack screws 41 threaded in it adjacent its rear edge that engage with the inside lower surface of the hood to adjust the angle of inclination or tilt of the reflector with reference to a horizontal plane. The upper plate 37 is mounted to protrude a slight distance beyond the hood and is riveted to the hood back of its front edge by rivets 42. It has jack screws 43 threaded into it adjacent its rear edge that engage the inside upper surface of the hood and that permit variation of its tilt to the horizontal plane. The side plate 35 is secured with its front edge flush with the left front edge of the hood. The side plate 36 is secured to protrude a slight distance beyond the hood, just like the plate 37. By making one vertical side plate and one horizontal plate flush with the front face of the hood, and the other two plates 36 and 37 protruding, it is possible to quickly fit the hood over a group of meters that are to be photographed, and to quickly remove the camera therefrom and shift it to another position.

The hood has a rectangular aperture 50 (Fig. 2) in its rear wall 51. This registers with a rectangular aperture 52 in the front wall 53 of the center section 21. The hood 20 is secured to the intermediate section 21 by bolts 55 that pass through the abutting walls 51 and 53 of the two sections.

Figure 1:
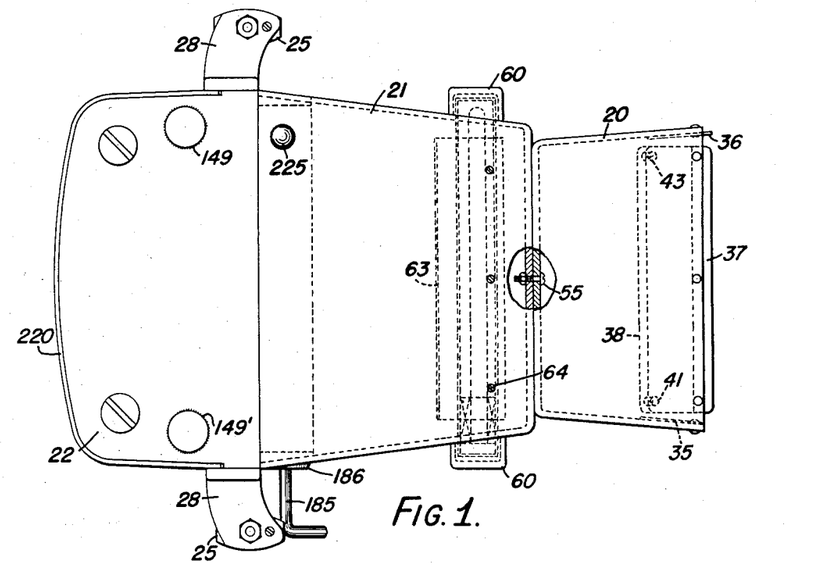
Fig. 1 is a plan view of a camera built according to one embodiment of this invention, parts of the hood and center section being broken away to show their connection.

Mounted adjacent the front of the center section 21 is a flash lamp assembly denoted generally at 60. This assembly which protrudes at opposite sides beyond the adjacent sides of the center section, see Fig. 1, is secured to the center section 21 by screws 61. It carries at top and bottom two parallel tubular gaseous type flash lamps 62, 62'. Reflectors 63 are provided behind these lamps to direct the illumination of the lamps at the meters or other objects to be photographed. The reflectors are secured in the center section 21 by screws 64.

The lens 70 (Figs. 4 and 8) of the camera, which may be of conventional type, is threaded into a ring or mount 72 which is mounted to slide reciprocably in a cylindrical guide 73 formed integral with and projecting forwardly from the front wall of the housing 30. This guide 73 is externally threaded on its periphery. The lens is adapted to be adjusted forward or backward for focusing by rotation of a pair of rings 75 (Figs. 6 and 8) which thread on the guide 73 and which are disposed at opposite sides of and engage diametrically opposed pins 76 that are fixed in the ring 72. Diametrically opposed, axially extending slots 77 are provided in the guide 73 to permit travel of the pins 76 forward and backward as the lens is adjusted in focusing.

A cover plate 80 (Figs. 8 and 9) is secured in the mounting member 72 behind the lens 70 by screws 81. This cover plate has an aperture 82 extending therethrough aligned axially with the lens.

Figure 8:
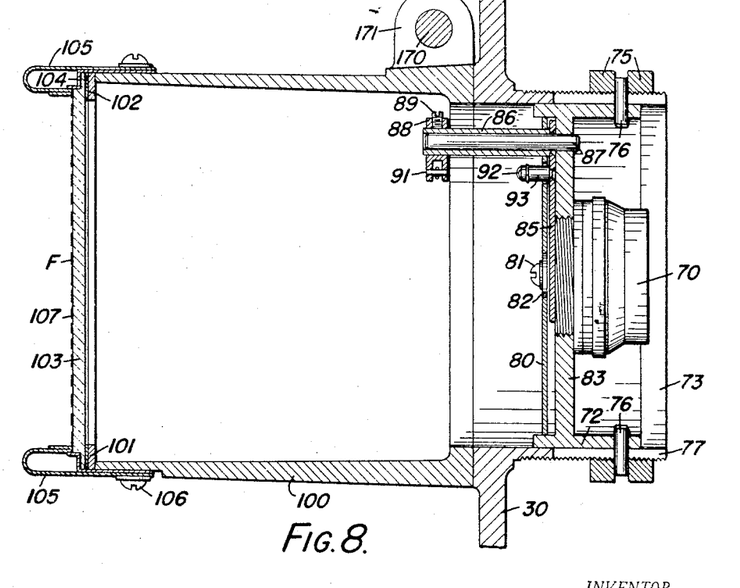
Fig. 8 is a fragmentary section on an enlarged scale taken in the plane of the line 8—8 of Fig. 9 looking in the direction of the arrows, and showing the lens mounting, the means for affecting focusing adjustment thereof, the shutter and its mounting, and the inner housing which carries the glass over the rear face of which the film travels.

Mounted between the cover plate 80 and the partition wall 83 of the member 72 is the shutter 85. The shutter 85 consists simply of an arm or blade of thin, flat sheet metal that is swaged on a sleeve 86 which is journaled on stud or shaft 87. Stud or shaft 87 is fixedly secured in partition wall 83. The sleeve 86 has a collar 88 secured to it at its rear end by a set-screw 89. The shutter is adapted to be rocked in one direction to open it by means of a cable 90 which has one end looped over a pin 91 that is secured in the collar 88. The shutter is returned to closed position, and constantly urged toward that position by means of a coil spring 92 that is engaged at one end over a pin 93 which is secured in the shutter, and that is engaged at its other end over a pin 94 that is fastened in the plate 80.

Secured to the transverse wall of the housing 30 by screws 96 (Figs. 4 and 9) is an inner housing 100. Mounted in the rear wall of this inner housing is a mask plate 101 which has a rectangular aperture therethrough. Seated against a rectangularly-apertured gasket 102, that rests against mask 101, is a glass 103. The glass is held in position by clamps 104. The rear face 107 of the glass constitutes the focal plane of the camera. The sensitized film travels from the supply roll to the take-up roll over the rear face 107 of the glass. It is held by spring clips 105 against surface 107. Both the clamps 104 and spring clips 105 are secured to housing 100 by screws 106.

The film is supplied from a cassette 110 (Figs. 5 and 6) traveling around an idler roller 111, over a roller 112 (Figs. 4 and 5), whose function will be described further hereinafter, across the surface 107 of the glass 103, around a measuring or metering roller 113 and into the take-up cassette 115.

The two cassettes 110 and 115 may be identical in construction and may be constructed as shown in the Steiner U. S. patent application Serial No. 227,131, filed May 19, 1951, now Patent No. 2,702,673. Each may comprise a body portion 116 (Fig. 11) having an opening at one side through which the film may be let into or let out of the cassette, and end caps 117. Each comprises a core 118 which is open at both ends and which is adapted to be connected to a driving pulley 120 at its lower end by face coupling teeth 121. Mounted in each core 118 is a cylindrical magnet 123, which is interposed between two brass spacers 124 and 125. The lower spacer 125 rests upon a headed brass pin 126 which is mounted in a recess 127 in the pulley 120. The core 118 is formed on its periphery with a lug or dog 128.

Figure 11:
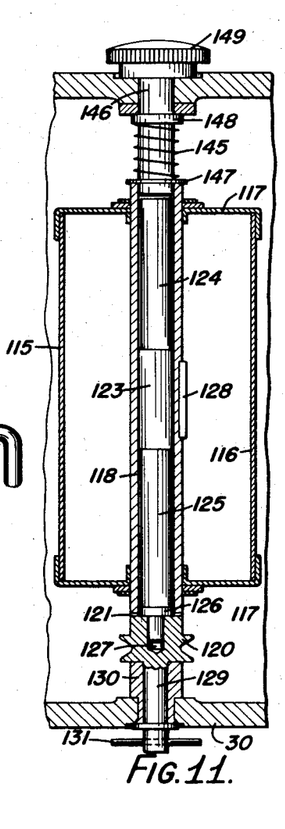
Fig. 11 is an axial sectional view of the take-up cassette on a greatly-enlarged scale taken on the line 11—11 of Fig. 6.

The cassettes are adapted to be used with film of the type described in the Steiner application referred to above, which has a metallic strip secured to its lead edge, and a rectangular opening or slot directly behind this strip. The metallic strip is adapted to be attracted to the core by the magnet 123; and, as the core is rotated, the lug 128 on the core engages in the slot behind the lead strip of the film and causes the film to be wound upon the core. The advantage of this type film and cartridge construction is, as pointed out in the Steiner application, that the lead end of the film can be fed in blindly into the cassette and nevertheless the film will be properly wrapped on the core.

Figure 7:
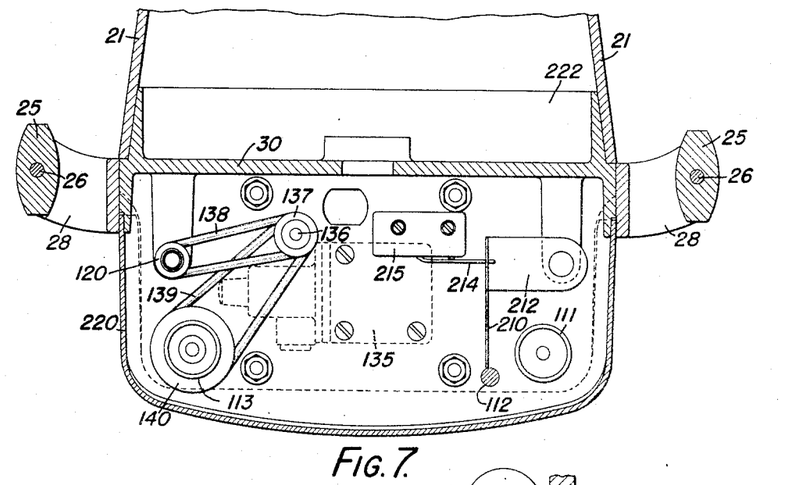
Fig. 7 is a section on the line 7—7 of Fig. 5, looking in the direction of the arrows.

The drive pulley 120 is integral with a shaft 129 that is journaled in a bushing 130 in the housing 30. The pulley 120 is adapted to be driven by power from a motor 135 (Figs. 4, 5 and 7) which drives through a standard gear reduction a vertical shaft 136 (Figs. 4, 5 and 7) to which is secured a pulley 137 (Figs. 5 and 7) that is provided with two V-grooves. A belt 138 connects one of these grooves with the pulley 120 (Figs. 7 and 11). A belt 139 connects the other groove with a pulley 140 (Figs. 5 and 7) that is integral with or secured to the measuring roller 113. Thus, both the core of the take-up cassette and the measuring roller are driven direct from the motor 135.

U-bolts 142 serve to guard the motor 135 from damage.

The core 118 of the take-up cassette is held connected to the pulley 120 by a coil spring 145 (Fig. 11) which surrounds a plunger 146 that is engageable in the upper end of the core 118. The spring is interposed between a ring 147, that seats against the upper end of the core 118, and a collar 148 formed on the plunger. The plunger has a knurled head 149, external of the housing 30, by means of which it may be pulled out of the core 118 against the resistance of the spring 145 to disengage it from the core, and to permit removal of the cassette 115 from the housing 30.

The cassette 110, as previously stated, may be similar in construction to the cassette 115. Its core 118 may be coupled, however, at its lower end to a sleeve or shaft journaled in housing 30, instead of to a pulley 120. At its upper end it may be held by a spring-pressed plunger 149' (Fig. 5) similar to plunger 149 (Fig. 11).

The measuring spool 113 has a stop-plate 155 (Fig. 6) keyed to it at its upper end by a tongue and groove connection which allows some play. A spring 205 tends to take up this play in the direction of rotation. The stop-plate is engaged by one arm of a bell crank locking lever 156 which is pivoted on the pin 157 mounted in housing 100.

Figure 6:
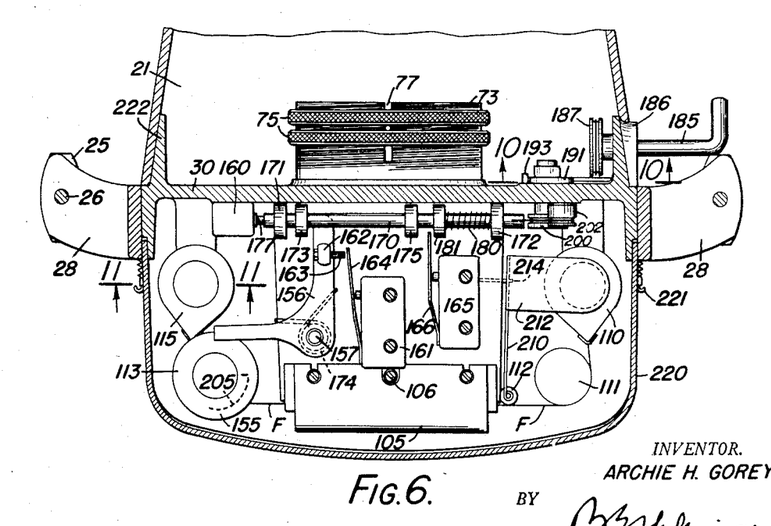
Fig. 6 is a section on the line 6—6 of Fig. 5 looking in the direction of the arrows.
Figure 12:
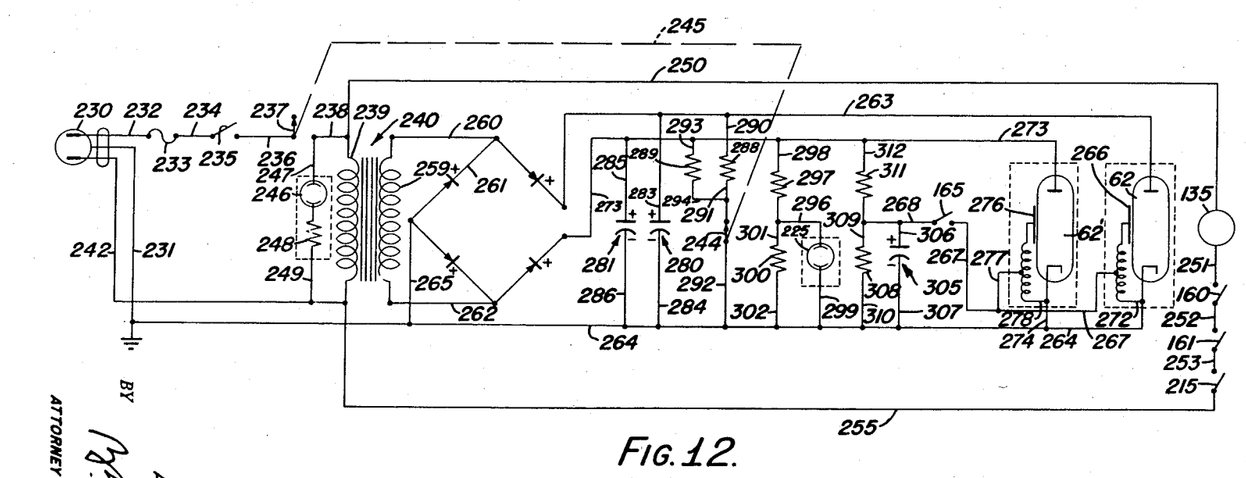
Fig. 12 is an electrical wiring diagram of the camera.

The motor 135 is controlled by two switches 160 and 161 (Figs. 6 and 12). Both of these switches must be closed in order for the motor to start. Both are normally open. The bell-crank 156 has a lug 162 on one arm which carries a threaded, adjustable trip pin 163 that is intended to engage a strap spring 164 to trip switch 161. A switch 165 controls the flash lamps. This switch is also a normally open switch and is adapted to be operated by a leaf spring 166.

An operating shaft 170, which is slidable axially in bearings 171 and 172 (Figs. 6 and 9) formed on housing 100, serves to operate the several switches 160, 161 and 165, and to time their operation. This shaft has a collar 173 integral with it that is adapted to engage the free end of the bell crank 156 and to rock the bell crank about its axis 157 to trip switch 161. A spring 174, which is coiled about the shaft 157 of the bell crank, and which is engaged at one end with the bell crank and at its opposite end with the housing 100, serves to hold the bell crank constantly in engagement with the collar 173. A collar 175 on the shaft 170 is adapted to engage leaf spring 166 in the rightward travel of shaft 170, and close switch 165. An adjustable stop screw 177, that threads into the left hand end of the rod 170, is adapted to engage a leaf spring 178, when the rod 170 is moved to the left, to close the switch 160.

Figures 9, 10:
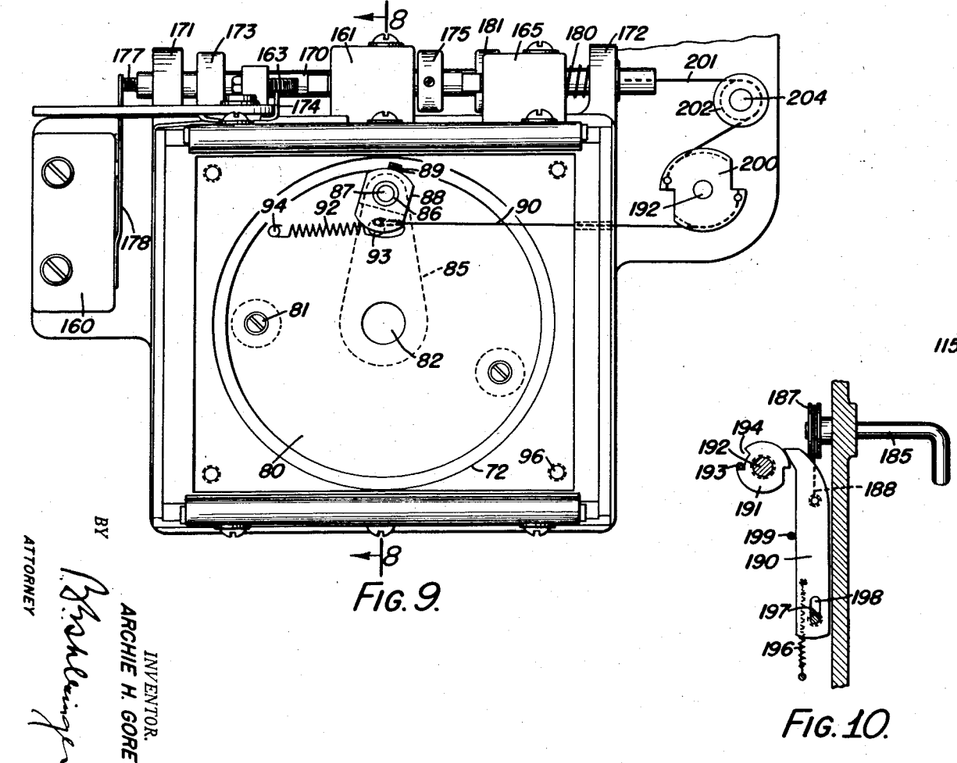
Fig. 9 is a rear view of the inner housing and of the parts mounted thereon, the view being taken with the ground glass removed.
Fig. 10 is a fragmentary view of parts of the triggering mechanism shown at the left in Fig. 4, and taken on the line 10—10 of Fig. 6, looking in the direction of the arrows, and showing the trigger at the end of its triggering movement.

The coil spring 180, which is coiled around the shaft 170 and which is interposed between bearing 172 and a collar 181 on the shaft, constantly urges the shaft to the left. The shaft is moved to the right by tripping of the trigger 185 of the camera.

Figure 4:
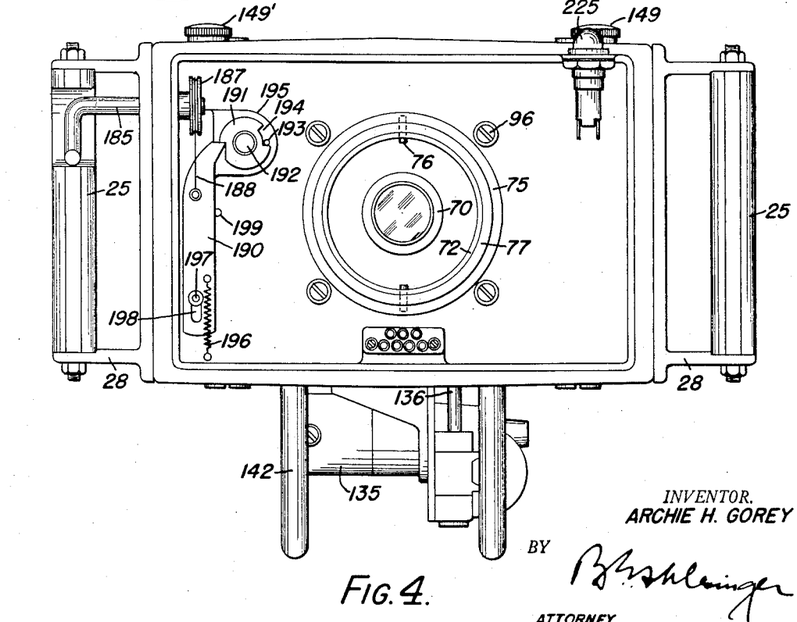
Fig. 4 is a front elevation of the camera with the hood removed.

The trigger is rockably supported in a boss 186 formed on the side of the housing 30. It carries a reel 187 to which is secured one end of a cable 188 (Figs. 4 and 10). The other end of this cable is secured to a pawl 190. This pawl is adapted to engage a ratchet wheel 191 that is secured to one end of a shaft 192 (Figs. 9 and 10) which is journaled in the housing 30. The ratchet wheel is limited in its movement by a pin 193, that engages in a peripheral groove 194 in the wheel. The pin is secured in a boss 195 (Fig. 4) integral with the housing 30. A coil spring 196, which is secured at one end to the pawl 190 and which is fastened at its other end to the housing 30, constantly urges the pawl downwardly. The pawl 190 is moved upwardly, on downward rotation of the trigger 185, to rotate the ratchet wheel 191. Its upward movement is limited by a pin 197 which engages in an elongate slot 198 formed in the pawl. The pawl 190 is guided in its movement by a pin 199.

Shaft 192 has a reel 200 secured to it (Fig. 9). Journaled on a stud 204, that is fastened in housing 30, is a pulley 202. A cable 201, which is fastened at one end to the rod 170, passes over this pulley and is secured at its other end to reel 200, that is secured to shaft 192. The cable 90, which is fastened at one end to the collar 88, is fastened at its other end to the reel 200.

Figure 2:
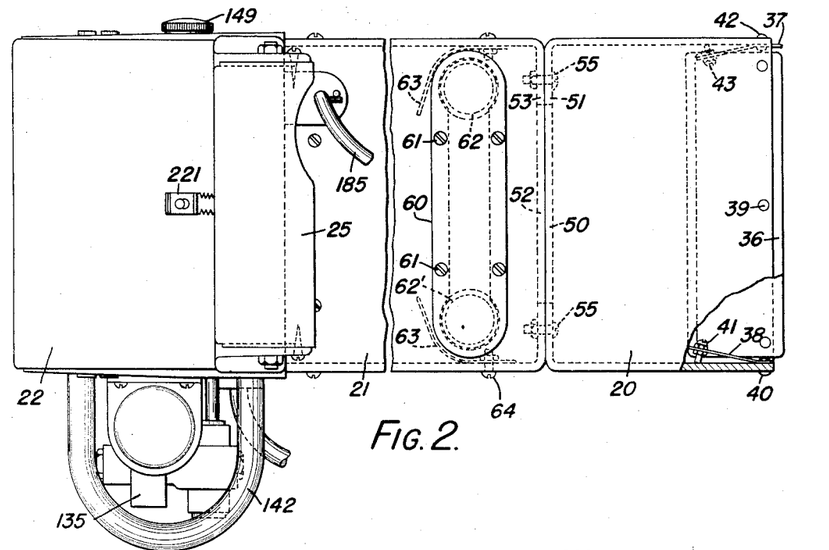
Fig. 2 is a side elevation of this camera on a slightly enlarged scale, part of the hood being broken away to show the reflector plates that engage about the meters that are to be photographed.
Figure 3:
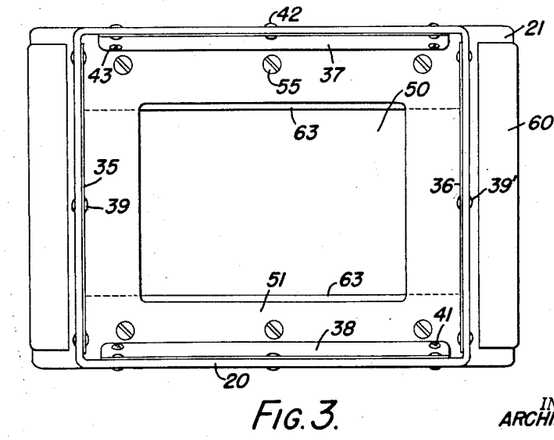
Fig. 3 is a front elevation of the camera, but omitting the trigger, gripping handles and other parts back of the center section of the camera.

When the trigger is actuated, then, the shaft 192 is rotated to rotate the reel 200 counterclockwise, as viewed in Fig. 9. This rotates the collar 88 and sleeve 86 (Fig. 8) and opens the shutter 85. Simultaneously the shaft 170 is pulled to the right by cable 201 (Fig. 9). This causes the collar 173 to trip the bell crank 156 (Fig. 6) out of engagement with the stop-plate 155, which permits spring 205 to rotate the stop-plate slightly so that the bell crank will ride up onto the periphery of the stop-plate. As the bell crank is tripped out of locking position, also, the adjustable trip pin 163 carried by the bell crank closes the switch 161 in the circuit to the motor 135; but the motor will not start, because both switch 160 and switch 161 must be closed in order for it to start. As the rod 170 moves on the right, its collar 175 will engage the leaf spring 166 and trip switch 165 to close the circuit to the flash lamps 62 and 62' (Fig. 2). The position of the collar on shaft 175 will be adjusted initially so that the tripping of the flash lamps will be synchronized to the opening of the shutter 85.

As soon as the pawl 190 clears the ratchet wheel 191, the spring 180 will act to return the shaft 170 to the left. Spring 92 (Fig. 9) will close the shutter 85. The exposure will have been completed.

As shaft 170 moves to the left collar 175 will release flash lamp switch 165. Switch 161 will, however, remain closed because the bell crank arm 156 is still on the periphery of the stop plate 155. When the shaft 170 has returned fully to the left, stop screw 177 will close the switch 160. This will start the motor 135, which will drive the measuring spool 113 and the core in the cassette 115, moving the exposed area away from the exposure aperture, and moving another area of film into position for exposure. The movement of the measuring spool 155 and movement of the film will be stopped when the lever 156 reengages the stop plate 155 of the measuring spool. When this occurs, the bell crank will move clear of the switch trip arm 164, so that the switch 161 will open and the motor will be stopped. Thus, the motor is stopped and the cycle is completed after a new portion of film has been moved into the exposure position. Since the stop plate 155, which is secured to the measuring spool, determines the amount of rotation of the spool, exactly equal amounts of film will be fed to exposure position on each cycle of the camera regardless of the amount of film wound on the supply spool or on the take-up spool.

Roller 112 (Figs. 5, 6 and 12) is carried on a plate 210 that is secured to a pair of parallel arms 212. Arms 212 are mounted to pivot about the axis of the core of cassette 110. A leaf spring 214, which is positioned to operate a switch 215, engages in a slot in arm 210. Switch 215 is in the starting circuit of the motor 135 and must be closed for that motor to start. Spring 214 tends to rock plate 210 and roller 112 counterclockwise, as viewed in Figs. 6 and 7, about their pivotal axis. The roller 112 is positioned, however, so that as the film F passes from supply cassette to take-up cassette it will engage the roller and swing the roller inwardly, clockwise about its pivotal axis, holding switch 215 closed.

When the supply of film is exhausted, however, the roller 112 is free to rock outwardly under actuation of spring 214. This will open limit switch 215 and will prevent further operation of the motor until a new supply of film has been placed in the camera and film has been led from the new supply cassette to the take-up cassette.

A cover 220 is provided to enclose a housing 30. This may be fastened to the housing detachably in any suitable manner as by clips 221 (Fig. 6). Housing 30 has a forwardly projecting portion 222 which has a forwardly tapered outer surface (Figs. 6 and 7) over which the center section 21 of the camera fits with a press fit. Center section 21 itself increases in overall dimension from front to rear as shown.

A charge indicating lamp 225 (Figs. 1, 4 and 12) is provided, which is wired in the circuit, as will be described further hereinafter, to indicate when the capacitors, which supply the current for the flashlamps, are charged sufficiently to operate the lamps.

One way in which the camera may be wired to effect its operation will now be described.

A plug 230 (Fig. 12), which may be of conventional construction, connects the circuit with a suitable source of electrical current. This plug is connected with ground through line 231. Plug 230 is connected through line 232, fuse 233, line 234, main line switch 235, line 236, switch 237, and line 238 with one side of the primary 239 of a transformer 240. It is connected through line 242 with the other side of the primary 239. Switch 237 is part of a double pole switch whose other arm is denoted at 244. The two arms being connected, as indicated diagrammatically by the dotted line 245, so that they move together. These two switches may be connected to a door of the box in which the power pack for the camera is mounted, so that when the door is opened the two switches are opened to break the circuit and prevent injury of the operator.

Mounted parallel with the primary 239 is a pilot or signal light 246 which is connected with line 238 by line 247 and which is connected with line 242 by resistor 248 and line 249. The signal light 246 is provided to indicate to the operator of the camera that the main line switch is closed, that the circuit, therefore, is closed.

Line 238 is connected by line 250 with one side of the motor 135. The motor is connected on its other side with line 242 by line 251, switch 160, line 252, switch 161, line 253, switch 215 and line 255. It will be seen, therefore, that the three switches 160, 161 and 215 have to be closed, as already described, in order for the motor 135 to operate.

The secondary of the transformer is denoted at 259. It is connected by line 260 with one side of a split bridge rectifier 261. It is connected by line 262 with the other side of this rectifier. The rectifier is connected by line 263 with one terminal of flash lamp 62. The second terminal of this lamp is connected by lines 264 and 265 with the rectifier, and with the ground. The triggering wire or coil 266 of the lamp 62 is connected by line 267 with switch 165. This switch is connected by lines 268 and 306 with a capacitor 305 which is connected by line 307 and lines 264 and 265 with the rectifier and the ground. The triggering coil is also connected with line 264 by line 272.

The rectifier is connected by a line 273 with one terminal of the flash lamp 62'. Another terminal of this flash lamp is connected by line 274, and lines 264 and 265 with the rectifier and with the ground. The triggering wire or coil 276 of this lamp is connected by lines 277 and 267 with the switch 165. The triggering wire or coil 276 is connected with line 274 by line 278.

Capacitors 280 and 281 are provided to supply current to the two lamps 62 and 62'. Capacitor 280 is connected with line 263 by line 283 and is connected with line 264 by line 284. Capacitor 281 is connected with line 273 by line 285 and is connected with line 264 by line 286. The capacitors are charged when the switches 237 and 244 are closed and main line switch 235 is closed. Switch 244, when closed, puts in the resistors 288 and 289, resistor 288 being connected to line 263 by line 290, and being connected with line 264 by line 291, switch 244 and line 292. Resistor 289 is connected with line 273 by line 293, and is connected with line 264 by line 294, line 291, switch 244, when closed, and line 292. The resistors balance the circuit to the capacitors, as long as switch 165 is open, and prevent the discharge of the capacitors until the switch 165 is closed.

The signal lamp 225, which is provided to indicate when the capacitors are charged sufficiently to actuate the triggering coils 266 and 276 of the two lamps, and which, therefore, shows that the camera is ready for operation, is connected with line 273 by line 296, resistor 297, and line 298. Signal lamp 220 is connected with line 264 by line 299. A resistor 300 is also provided that is connected with line 296 by line 301, and that is connected with line 264 by line 302. Capacitor 305, which is mounted in parallel with the signal lamp 225, energizes the triggering coils 266 and 276. It is connected with line 268 by the line 306, and with line 264 by a line 307. A resistor 308 is also provided that is connected with line 268 by line 309 and with line 264 by line 310. A resistor 311 is connected with resistor 308 by line 309. It is connected with line 273 by line 312. Resistor 308 balances and maintains the charge in capacitor 305 until switch 165 is closed by operation of collar 175 (Fig. 6) of rod or shaft 170.

By providing a split bridge rectifier, the two flash lamps 62, 62' may be charged simultaneously. By providing two lamps, which are disposed at opposite sides of the lens, even distribution of light is attained over the object to be photographed, reflection is eliminated, and very sharp pictures are obtained.

The sensitized material used with this camera is preferably a paper of say .0035 inch thickness with the emulsion on the back of the paper so that the image is projected right through the paper to obtain an erect image without the use of mirrors or prisms. A picture can be taken with such material and with the camera of the present invention every three seconds; and by moving the camera from one block of meters to another an operator can cover the bank of meters in a telephone exchange in much shorter time than has been possible with previous designs of recording cameras. Moreover, the mechanism of the present camera is simple and will not readily get out of order.

While the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A photographic camera having an exposure aperture, a shutter movable from closed to open position and vice versa, a flashlamp for illuminating the object to be photographed, a rotatable film supply spool mounted at one side of said aperture, a rotatable film take-up spool mounted at the other side of said aperture, a rotary measuring spool over which the film passes in its movement from the supply spool to the take-up spool, an electric motor for driving both said take-up spool and said measuring spool, a manually-operable trigger, means connected to said trigger to open said shutter when the trigger is operated, means constantly urging said shutter to closed position, a movable lock member for locking said measuring roll against rotation, means constantly urging said lock member into locking position, a rectilinearly reciprocable control member connected to said trigger to be moved in one direction upon operation of said trigger, means for constantly urging the control member in the opposite direction, means carried by said control member and projecting laterally therefrom for closing an electrical circuit to said flashlamp in synchronism with the opening of said shutter after said control member has moved a predetermined distance in said one direction, means carried by said control member and projecting laterally therefrom for moving said lock member to released position upon movement of said control member in said one direction, means carried by said control member for actuating said motor on movement of said control member in said opposite direction, and a switch incorporated in the electrical circuit to said motor to stop said motor when said measuring roll has made one revolution.

2. A photographic camera having an exposure aperture, a shutter movable from closed to open position and vice versa, a flashlamp for illuminating the object to be photographed, a rotatable film supply spool mounted at one side of said aperture, a rotatable film take-up spool mounted at the other side of said aperture, a rotary measuring spool over which the film passes in its movement from the supply spool to the take-up spool, an electric motor for driving both said take-up spool and said measuring spool, a manually-operable trigger, means connected to said trigger to open said shutter when the trigger is operated, means constantly urging said shutter to closed position, a movable lock member for locking said measuring roll against rotation, means constantly urging said lock member into locking position, a rectilinearly reciprocable control member connected to said trigger to be moved rectilinearly in one direction upon operation of said trigger, means for constantly urging the control member in the opposite direction, means carried by said control member for closing an electrical circuit to said flashlamp in synchronism with the opening of said shutter after said control member has been moved a predetermined distance in said one direction, means carried by said control member for moving said lock member to released position upon movement of said control member in said one direction, means carried by said control member for actuating said motor on movement of said control member in said opposite direction, and a switch incorporated in the electrical circuit to said motor and operatively connected to said lock member to stop said motor when said lock member returns to locking position.

3. A photographic camera having an exposure aperture, a shutter movable from closed to open position and vice versa, a flashlamp for illuminating the object to be photographed, a rotatable film supply spool mounted at one side of said aperture, a rotatable film take-up spool mounted at the other side of said aperture, a rotary measuring spool over which the film passes in its movement from the supply spool to the take-up spool, an electric motor for driving both said take-up spool and said measuring spool, a manually-operable trigger, means connected to said trigger to open said shutter when the trigger is operated, means constantly urging the shutter to closed position, a movable lock member for locking said measuring roll against rotation, means constantly urging said lock member into locking position, a reciprocable control member connected to said trigger to be moved in one direction upon operation of said trigger, means constantly urging said control member in the opposite direction, means carried by said control member for moving said lock member to released position on movement of said control member in said one direction, a normally-open switch in the electrical circuit to said flashlamp, a pair of normally-open switches in the electrical circuit to said motor, a trip member carried by said control member for closing the first switch on movement of the control member a predetermined distance in said one direction, a second trip member carried by said lock member for closing one of said pair of switches on movement of said lock member to released position, a third trip member carried by said control member for closing the other of said pair of switches on movement of the control member in the opposite direction, and means for holding said lock member, when released, in released position until said measuring roll has made a complete revolution.

4. A photographic camera having an exposure aperture, a rotatable film supply spool mounted at one side of said aperture, a rotatable film take-up spool mounted at the other side of said aperture, a rotary measuring spool over which the film passes in its movement from supply spool to take-up spool, said spools having parallel axes, an electric motor for driving both said take-up spool and said measuring spool, a manually operable trigger, a rectilinearly reciprocable control member, said control member being reciprocable in a direction at right angles to the axes of said spools, means connecting said trigger to said control member to move said control member rectilinearly in one direction on actuation of said trigger, means constantly urging said control member in the opposite direction, a movable lock member for locking said measuring roll against rotation, means constantly urging said lock member to locking position, means connected to said control member to release said lock member on movement of said control member rectilinearly in said one direction, means carried by said control member to start said motor on movement of said control member rectilinearly in the opposite direction, means preventing the lock member from returning fully to locked position until said measuring roll has made a complete revolution, and means for stopping said motor when said lock member is in locking position.

5. A photographic camera having an exposure aperture, a rotatable film supply spool mounted at one side of said aperture, a rotatable film take-up spool mounted at the other side of said aperture, a rotary measuring spool over which the film passes in its movement from supply spool to take-up spool, an electric motor for driving both said take-up spool and said measuring spool, a manually operable trigger, a reciprocable control member, means connecting said trigger to said control member to move said control member in one direction on actuation of said trigger, means constantly urging said control member in the opposite direction, a movable lock member for locking said measuring roll against rotation, means constantly urging said lock member to locking position, means carried by said control member for moving said lock member to released position on movement of said control member in said one direction, a pair of normally-open switches in the electrical circuit to said motor, a trip member carried by said lock member for closing one of said pair of switches on movement of the lock member to released position, a trip member carried by said control member for closing the other of said pair of switches on movement of said control member in the opposite direction, and means carried by said measuring spool for holding said lock member, after release, in released position until said measuring roll has made a complete revolution.

6. A photographic camera having an exposure aperture, a shutter movable from closed to open position and vice versa, a flashlamp for illuminating the object to be photographed, a film supply spool rotatably mounted at one side of said aperture, a film take-up spool rotatably mounted at the other side of said aperture, a rotary measuring spool over which the film passes in its movement from the supply spool to the take-up spool, an electric motor for driving both said take-up spool and said measuring spool, a manually-rotatable trigger, a reel fixedly secured to rotate with said trigger, a rotary ratchet wheel, a reciprocable pawl cooperating with said ratchet wheel and operable to rotate said ratchet wheel in one direction on movement of the pawl in one direction, a cable secured at one end to said reel and at its opposite end to said pawl to move said pawl in the direction to rotate said ratchet wheel on actuation of said trigger, a second reel connected to said ratchet wheel to rotate therewith, a cable connecting said second reel to said shutter to open said shutter on actuation of said trigger, a spring constantly urging said shutter to closed position, a spring constantly urging said pawl to retracted position, a reciprocable control member, a cable connecting said second reel to said control member to move said control member in one direction on actuation of said trigger, a spring constantly urging said control member in the opposite direction, a lock plate secured to said measuring spool, a rockable lock dog engageable with said lock plate to hold said lock plate against rotation, a spring constantly urging said lock dog into locking position, a normally-open switch in the electrical circuit to said flashlamp, a pair of normally-open switches in the electrical circuit to said motor, a trip member carried by said control member for closing the first switch on movement of said control member in the said one direction in which it is moved on actuation of said trigger, a second trip member carried by said control member for rocking said lock dog out of locking position on movement of said control member in the said one direction, a third trip member carried by said lock dog for closing one of said pair of switches on movement of said lock dog to released position, a fourth trip member carried by said control member for closing the other of said pair of switches on return of said control member to its starting position under actuation of its spring, and a spring for rotating said measuring spool through a slight angle when unlocked, said lock plate being so shaped as to hold said lock dog in released position, after each slight rotation, until said measuring spool has completed a full revolution.

7. A photographic camera having an exposure aperture, a rotatable film supply spool mounted at one side of said aperture, a rotatable film take-up spool mounted at the other side of said aperture, a rotary measuring spool over which the film passes in its movement from supply spool to take-up spool, said spools having parallel axes, an electric motor for driving both said take-up spool and said measuring spool, a manually operable trigger, a rectilinearly reciprocable control member, said control member being reciprocable in a direction at right angles to the axes of said spools, means connecting said trigger to said control member to move said control member in one direction on actuation of said trigger, means constantly urging said control member in the opposite direction, a stop plate secured to said measuring spool, a rockable lock dog engageable with said stop plate to hold said lock plate against rotation, said lock dog being rockable about an axis parallel to the axis of said measuring spool, means constantly urging said lock dog into locking position, a trip member carried by and projecting laterally from said control member for rocking said lock dog out of locking position on movement of said control member in said one direction, means carried by said control member for starting said motor on further movement of said control member, a spring for rotating said measuring spool slightly on release of said lock dog, said stop plate being shaped to hold said lock dog in released position, after said slight rotation, until said measuring spool has completed a full revolution, and means operated by said lock dog on its return to locking position to stop said motor.

References Cited in the file of this patent

UNITED STATES PATENTS

| | | |
|---|---|---|
| Re. 23,606 | Bornemann et al. | Dec. 30, 1952 |
| 481,343 | Bristol | Aug. 23, 1892 |
| 675,781 | MacDonald | June 4, 1901 |
| 975,277 | Pond | Nov. 8, 1910 |
| 1,448,526 | Dobbin | Mar. 13, 1923 |
| 1,720,224 | Lessler et al. | July 9, 1929 |
| 1,864,768 | Seeling | June 28, 1932 |
| 1,955,300 | Kurnick | Apr. 17, 1934 |
| 1,963,095 | Petit et al. | June 19, 1934 |
| 2,129,001 | Goehner | Sept. 6, 1938 |
| 2,482,107 | Hackethorn | Sept. 20, 1949 |
| 2,608,920 | Smith | Sept. 2, 1952 |
| 2,679,790 | Clark | June 1, 1954 |